(12) United States Patent
Takedomi et al.

(10) Patent No.: US 9,487,179 B2
(45) Date of Patent: Nov. 8, 2016

(54) CURTAIN AIRBAG AND CURTAIN AIRBAG DEVICE

(71) Applicants: Akifumi Takedomi, Tokyo (JP); Sakae Sugimori, Tokyo (JP)

(72) Inventors: Akifumi Takedomi, Tokyo (JP); Sakae Sugimori, Tokyo (JP)

(73) Assignee: TAKATA CORPORATION (JP)

( * ) Notice: Subject to any disclaimer, the term of this patent is extended or adjusted under 35 U.S.C. 154(b) by 0 days.

(21) Appl. No.: 14/809,872

(22) Filed: Jul. 27, 2015

(65) Prior Publication Data

US 2016/0031404 A1 Feb. 4, 2016

(30) Foreign Application Priority Data

Jul. 30, 2014 (JP) ................................. 2014-155040

(51) Int. Cl.
*B60R 21/232* (2011.01)
*B60R 21/2338* (2011.01)
*B60R 21/2334* (2011.01)

(52) U.S. Cl.
CPC ......... *B60R 21/232* (2013.01); *B60R 21/2334* (2013.01); *B60R 21/2338* (2013.01); *B60R 2021/23386* (2013.01)

(58) Field of Classification Search
CPC ............ B60R 21/232; B60R 21/2338; B60R 21/2334; B60R 2021/23386
See application file for complete search history.

(56) References Cited

U.S. PATENT DOCUMENTS

| 7,500,694 | B2 | 3/2009 | Heudorfer et al. |
| 7,828,322 | B2 | 11/2010 | Breuninger et al. |
| 7,922,193 | B2 | 4/2011 | Breuninger et al. |
| 7,967,334 | B2 | 6/2011 | Breuninger et al. |
| 8,789,846 | B2 * | 7/2014 | Wipasuramonton .. B60R 21/232 280/730.2 |
| 9,114,776 | B2 * | 8/2015 | Thomas ............. B60R 21/2338 |
| 9,227,590 | B2 * | 1/2016 | Fujiwara ........... B60R 21/23138 |
| 2005/0206138 | A1 * | 9/2005 | Breuninger ........... B60R 21/231 280/729 |
| 2005/0206147 | A1 | 9/2005 | Sievers |
| 2015/0307057 | A1 * | 10/2015 | Moon ................... B60R 21/232 280/728.2 |

FOREIGN PATENT DOCUMENTS

JP   2006-137413   6/2006

\* cited by examiner

*Primary Examiner* — Drew Brown
(74) *Attorney, Agent, or Firm* — Fitch Even Tabin & Flannery LLP

(57) ABSTRACT

A curtain airbag includes a curtain airbag main body and a tie panel. The tie panel is arranged on an opposite-interior surface of the curtain airbag main body and is connected to the curtain airbag main body at upper and lower portions of the tie panel. The curtain airbag main body includes first and second panels. At an overlapping area of the curtain main body and the tie panel, the first and second panels are coupled with each other by linear coupling portions which are radially extend toward four directions so as to form four inflation portions. A communication portion communicates two of the four inflation portions with each other. When the curtain airbag main body is inflated, a space is formed between the communication portion and the tie panel.

7 Claims, 14 Drawing Sheets

CURTAIN AIRBAG AND CURTAIN AIRBAG DEVICE

CROSS-REFERENCE TO RELATED APPLICATION

This application claims the benefit of Japanese Patent Application No. 2014-155040, filed on Jul. 30, 2014, the entire contents of which are hereby incorporated by reference, the same as if set forth at length, the entire of which are incorporated herein by reference.

TECHNICAL FIELD

The present invention relates to a curtain airbag (curtain-shaped airbag) configured to be deployed downward along a side surface of an interior of a vehicle. Specifically the present invention relates to a curtain airbag having a curtain airbag main body configured to be inflated by gas from an inflator and a tie panel provided on an opposite-interior side of a part of the curtain airbag main body, which is located at middle thereof in a front and rear direction. Also, the present invention relates to a curtain airbag device having the curtain airbag.

BACKGROUND ART

In a vehicle having a curtain airbag device, when the vehicle is subjected to a side crash, rollover or the like, a curtain airbag is inflated toward a lower side of a vehicle body along a side surface (e.g., a door, a pillar or the like) of an interior of the vehicle.

In Patent Document 1 (JP-A-2006-137413), a curtain airbag is described which includes a curtain airbag main body configured to be inflated by gas from an inflator and a tie panel arranged on an opposite-interior side of a part of the curtain airbag main body, which is located at a middle thereof in a front and rear direction of a vehicle. An upper side portion and a lower side portion of the tie panel are respectively sewn to an upper portion and a lower portion of the curtain airbag main body. A length of the tie panel from an upper sewn portion to a lower sewn portion is shorter than a length of the curtain airbag main body from an upper sewn portion to a lower sewn portion. Accordingly, when the curtain airbag main body is inflated, as in a paragraph 0033 and FIG. 7C of Patent Document 1, the curtain airbag main body has a ←-shape or L-shape as viewed from the lateral side, and a triangle prism-shaped space having a triangle shape as viewed form the front or rear side is formed between the curtain airbag main body and the tie panel.

Upon vehicle emergency, when a passenger is received by the curtain airbag main body, gas in the curtain airbag main body is flowed out and also the curtain airbag main body is deformed so that the triangle prism-shaped space is decreased, thereby absorbing an energy exerted on the passenger.

[Patent Document 1] JP-A-2006-137413

SUMMARY OF INVENTION

Technical Issue

According to the curtain airbag of Patent Document 1, an inflation internal pressure of the curtain airbag main body needs be increased to allow a more amount of energy to be absorbed. To this end, an inflator having a large capacity and also generating a more amount of gas at an initial operation thereof is required.

Also, because a package volume after folding is increased by stacking longitudinal cells and coupling members one on top of another, the curtain airbag is likely not to be completely received in an airbag mounting space if a thin cloth is not employed.

Accordingly, an object of the present is to provide a curtain airbag and a curtain airbag device having the curtain airbag, in which even if an inflation internal pressure of a curtain airbag main body is low, energy exerted on a passenger can be decreased and also a package volume can be reduced.

Solution to Problem

A curtain airbag of the present invention is configured to be deployed downward along a side surface of an interior of a vehicle. The curtain airbag includes a curtain airbag main body and a tie panel. The curtain airbag main body is inflated by gas from an inflator. The tie panel is arranged on an opposite-interior surface of a tie panel arranging portion and is connected to an upper portion and a lower portion of the curtain airbag main body by an upper connection unit and a lower connection unit respectively. The tie panel arranging portion is a middle part of the curtain airbag main body in a front and rear direction of the vehicle. The curtain airbag main body includes a first panel on an interior side, a second panel on an opposite-interior side and a coupling portion. The coupling portion couples the first panel and the second panel with each other. The coupling portion includes a peripheral edge coupling portion and an inner coupling portion. The peripheral edge coupling portion extends along peripheral edges of the first panel and the second panel. The inner coupling portion is positioned more inward than the peripheral edge coupling portion. A length of the tie panel from the upper connection unit to the lower connection unit is shorter than a length of the curtain airbag main body from the upper connection unit to the lower connection unit. The inner coupling portion includes radial coupling portions which are provided to extend in three or more multi radial directions from a center portion of the tie panel arranging portion or a vicinity of the center portion. A plurality of inflation chambers are delimited in the tie panel arranging portion by the radial coupling portions. A communication portion is provided on the center portion of the tie panel arranging portion or the vicinity of the center portion to communicate at least two inflation chambers with each other.

It is preferable that the radial coupling portions in at least three directions extend obliquely upward or downward from the center portion of the tie panel arranging portion or the vicinity of the center portion in the front and rear direction of the vehicle.

In the present invention, it is preferable that the radial coupling portions includes first, second, third and fourth radial coupling portions. The first radial coupling portion is provided to extend forward and upward from the center portion of the tie panel arranging portion or the vicinity of the center portion in the front and rear direction of the vehicle. The second radial coupling portion is provided to extend forward and downward in the front and rear direction of the vehicle. The third radial coupling portion is provided to extend rearward and downward in the front and rear direction of the vehicle. The fourth radial coupling portion is provided to extend rearward and upward in the front and rear direction of the vehicle.

In the present invention, it is preferable that a rear end of the first radial coupling portion is connected with a rear end of the second radial coupling portion and a front end of the third radial coupling portion is connected with a front end of the fourth radial coupling portion. The communication portion communicates an upper inflation chamber above the communication portion with a lower inflation chamber below the communication portion.

In another embodiment of the present invention, a rear end of the first radial coupling portion is connected with a front end of the fourth radial coupling portion and a rear end of the second radial coupling portion is connected with a front end of the third radial coupling portion. The communication portion communicates a front side inflation chamber in front of the communication portion with a rear side inflation chamber in the rear of the communication portion.

It is preferable that a length of the curtain airbag main body at the tie panel arranging portion is longer than a length of the curtain airbag main body in an adjacent region in front or the rear of the tie panel arranging portion, in the upward and downward direction.

Advantageous Effects of Invention

According to the curtain airbag and the curtain airbag device of the present invention, when the curtain airbag main body is inflated by gas from the inflator, a portion, which is provided with the radial coupling portions, protrudes toward the interior side so that a space is formed between the inflated portion and the tie panel. If the portion retains a passenger, a volume of the inflated curtain airbag is reduced and also a volume of the space is reduced, thereby absorbing an impact on the passenger. In this case, because the radial coupling portions extend in at least three directions, a force exerted on the curtain airbag main body from the passenger is dispersed in three or more multi directions. Accordingly, even if the curtain airbag has a lower inflation internal pressure, the curtain airbag can retain the passenger, thereby allowing a lower power inflator to be employed.

Also, according to the curtain airbag of the present invention, a plurality of longitudinal cells need not be provided therein, so that a package volume thereof can be decreased.

The radial coupling portions are respectively provided to extend obliquely in four directions of upward, downward, forward and rearward from the communication portion, so that inflation chambers are respectively formed above, below, in front and rear of the communication portion. Accordingly, even if an inflation internal pressure is low, the curtain airbag can retain the passenger. In this case, because the inflation chambers above and below the communication portion are communicated with each other by the communication portion, gas from the inflator passes through the upper inflation chamber and the communication chamber and then is introduced into the lower inflation chamber so that the curtain airbag can be early deployed downward.

DESCRIPTION OF EMBODIMENTS

Figure 1:
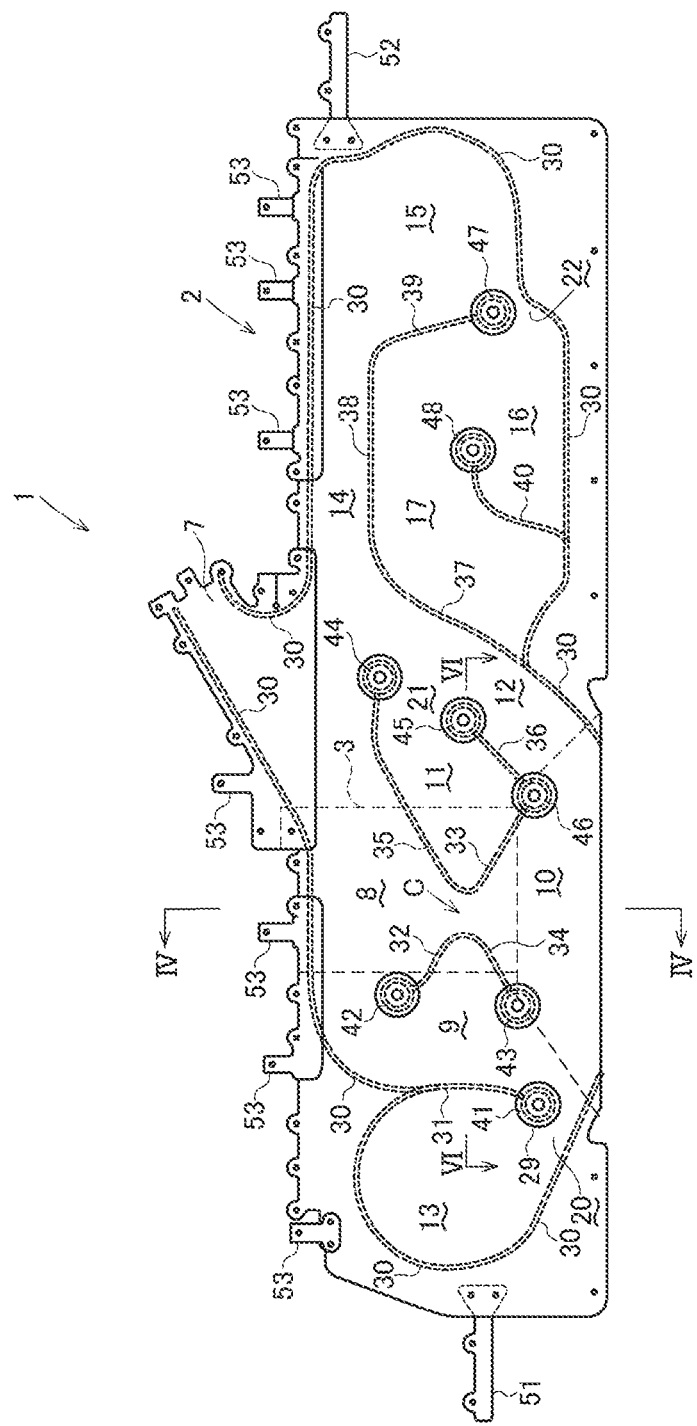
FIG. 1 is a front view showing a curtain airbag of an embodiment as viewed form an interior side thereof.
Figure 2:
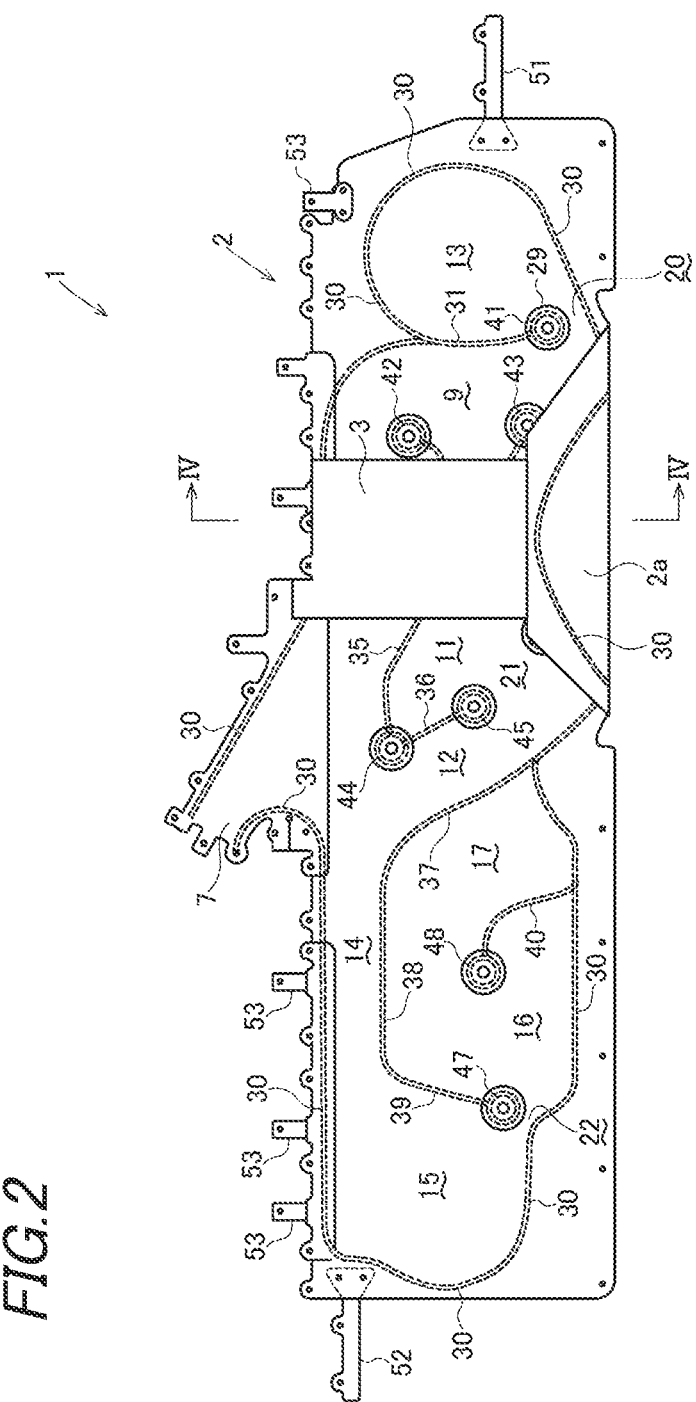
FIG. 2 is a rear view of the curtain airbag of FIG. 1.
Figures 3A, 3B:
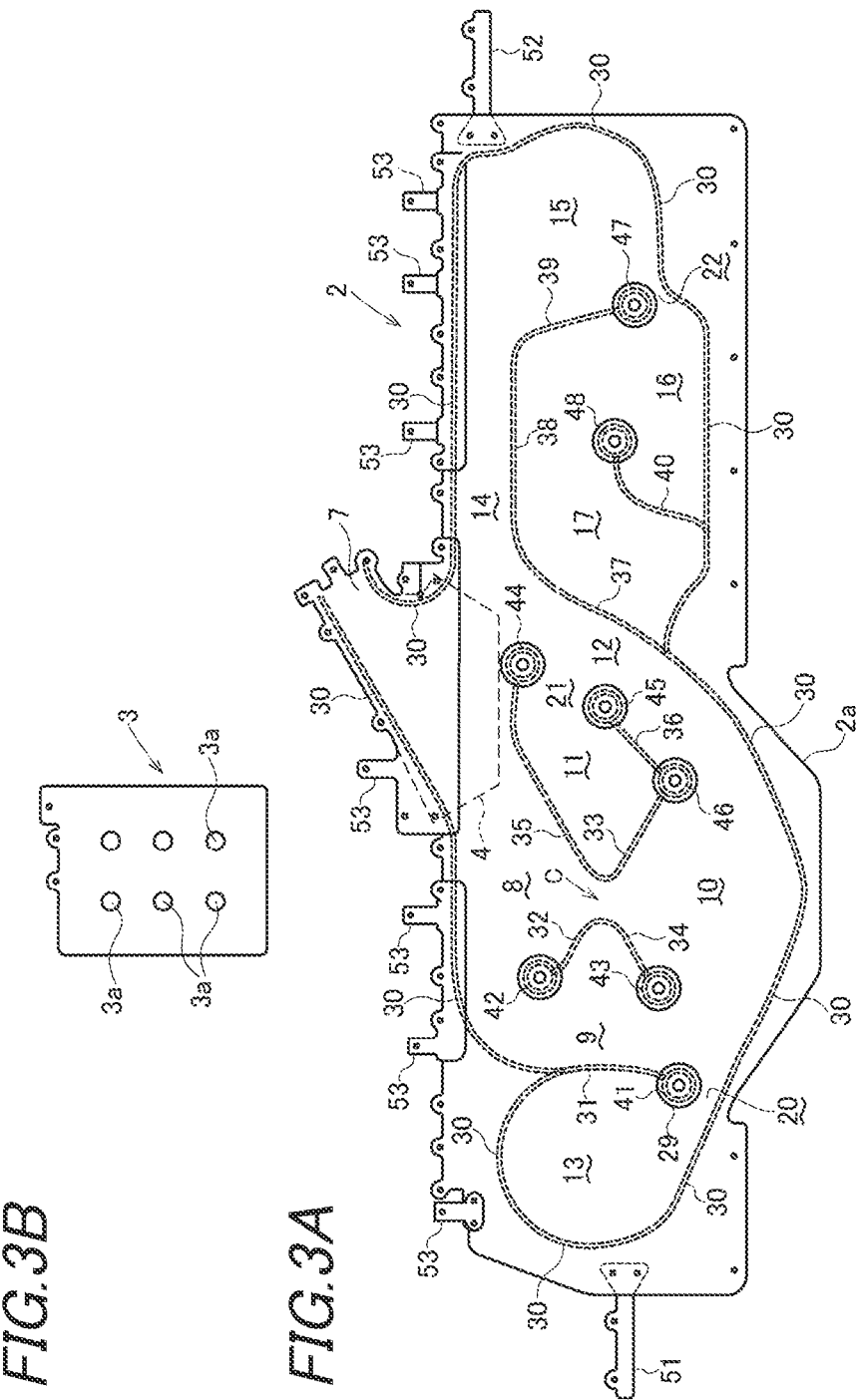
FIG. 3A is a front view of a curtain airbag main body of FIG. 1
FIG. 3B is a front view of a tie panel.

A curtain airbag 1 according to an embodiment of the present invention will be now described with reference to FIGS. 1 to 7. Meanwhile, in the following description, a front and rear direction and an upward and downward direction coincide respectively with a vehicle front and rear direction and a vehicle upward and downward direction when the curtain airbag 1 is installed in a vehicle. In FIGS. 1 to 3, the curtain airbag or a curtain airbag main body is shown in a flatly spread state before folding.

The curtain airbag 1 includes a curtain airbag main body 2, a tie panel 3 provided on an opposite-interior side of the curtain airbag main body 2 and a duct panel 4 (FIG. 3) arranged in the curtain airbag main body 2. An inflator is inserted in an inflator insertion port 7, and the duct panel 4 is intended to divide a flow of gas from the inflator forward and rearward.

In this embodiment, as shown in FIGS. 4 to 7, the curtain airbag main body 2 is configured so that an interior-side panel 5 (first panel) and an opposite-interior-side panel 6 (second panel) are piled up and then the panels 5 and 6 are coupled to each by linear coupling portions 30 to 40 and annular coupling portions 41 to 48, thereby forming the inflator insertion port 7, inflation chambers 8 to 17 and gas passage portions 20 to 22 between both panels 5 and 6.

Each of linear coupling portions 30 to 40 and each of annular coupling portions 41 to 48 are configured to couple the panels 5 and 6 together in an airtight manner and are formed by a strong coupling unit (e.g., sewing by a high-strength sewing yarn, adhering by a high-strength adhesive, or welding) which can prevent the panels 5 and 6 from being separated from each other even if an internal pressure of the curtain airbag main body 2 is increased up to a designed upper limit pressure. When the panels 5 and 6 are sewn, the panels may be sewn after a sealant is applied on intended sewing portions of the panels, or may be sewn without applying a sealant. Parts of liner coupling portions (e.g., linear coupling portions 32 to 35) may be formed by interweaving the panels 5 and 6.

The linear coupling portion 30 is a peripheral edge coupling portion extending to substantially circulate around the curtain airbag main body 2. The linear coupling portion 30 is interrupted at a middle of an upper edge of the curtain airbag main body 2 in the front and rear direction so that the inflator insertion port 7 is formed.

Figure 4:
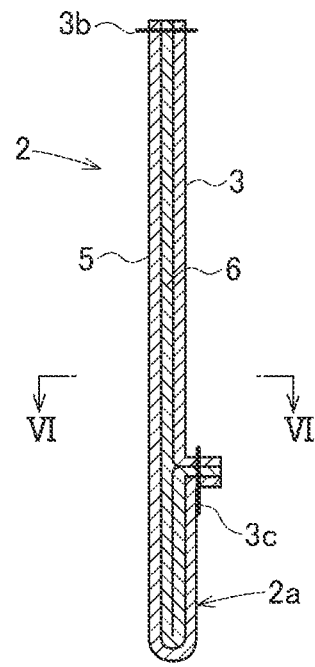
FIG. 4 is a sectional view taken along an IV-IV line in FIGS. 1 and 2.
Figure 5:
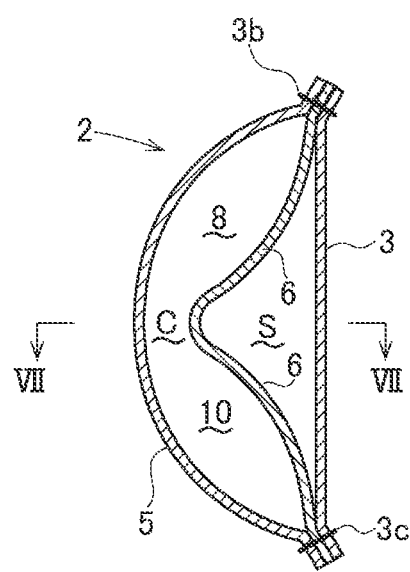
FIG. 5 is a section view of the same portion as that of FIG. 4 in a state where the curtain airbag is inflated.
Figure 6:
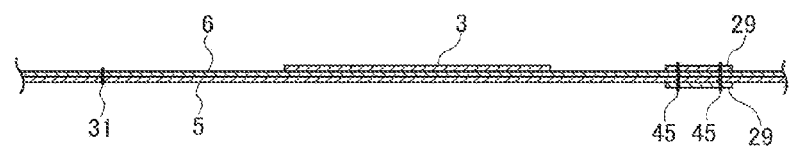
FIG. 6 is a sectional view taken along a VI-VI line in FIG. 1.

As shown in FIGS. 4 and 5, an upper side portion of the tie panel 3 is sewn to the panels 5 and 6 by an upper connection unit 3b along an upper side portion of the curtain airbag main body 2. A lower side portion of the tie panel 2 is sewn to the panels 5 and 6 by a lower connection unit 3c along a lower side portion of the curtain airbag main body 2. The upper connection unit 3b may be the linear coupling portion 30 located on the upper side, or may be a sewing portion different therefrom. The lower connection unit 3c may be the linear coupling portion 30 located on the lower side, or may be a sewing portion different therefrom. The tie panel 3 is provided with a plurality of air passage openings 3a (FIG. 3).

As shown in FIG. 3, the curtain airbag main body 2 has an extension portion 2a extending downward below a tie panel arranging portion. The tie panel arranging portion is a region in which the tie panel 3 is arranged and is a middle part of the curtain airbag main body 2 in a front and rear direction of the vehicle. By having the extension portion 2a, the curtain airbag main body 2 is configured so that a length of the tie panel arranging portion in the upward and downward direction is shorter than a length the curtain airbag main body including the extension portion 2a, in the upward and downward direction. The extension portion 2a is folded up upward and also toward the opposite-interior side as shown in FIG. 4 and then is sewn to the lower side portion of the tie panel 3 by the lower connection unit 3c.

A length from the upper connection unit 3b to the lower connection unit 3c in a state where the tie panel 3 is flatly spread is shorter than a length from the upper connection unit 3b to the lower connection unit 3c on the curtain airbag main body 2 before the tie panel 3 is attached thereon.

On a front portion of the curtain airbag main body 2, the liner coupling portion 30 on the upper side thereof extends in a V-shape, and the linear coupling portion 31 extend downward from a lower end of the V-shape and is connected to the annular coupling portion 41. Additionally, a circular patch cloth 29 is arranged on a portion provided with the annular coupling portion 41, and the panels 5, 6 and the patch cloth 29 are sewn together by the annular coupling portion 41. Similarly, each of annular coupling portions 42 to 48 as described below is provided with a patch cloth. Alternatively, although in this embodiment, the linear coupling portion 31 continues from the linear coupling portion 30 to the annular coupling portion 41, a non-coupling portion may be provided on middle thereof for communicating the inflation chambers 9 and 13 with each other.

A region between the annular coupling portion 41 and the liner coupling portion 30 on a front side is the inflation chamber 13. A region between the annular coupling portion 41 and the liner coupling portion 30 on the lower side is the gas passage portion 20. Two annular coupling portions 42 and 43 are arranged more rearward than the linear coupling portion 31 and also slightly more forward than the tie panel 3. Then annular coupling portion 42 is positioned above the annular coupling portion 43. The annular coupling portion 43 is positioned substantially at the same height as that of the lower side of the tie panel 3.

Three annular coupling portions 44, 45 and 46 are arranged slightly more rearward than the tie panel 3. The annular coupling portion 44 at the highest location is positioned below the inflator insertion port 7. The annular coupling portion 46 at the lowest location is positioned in the vicinity of a rear portion of the lower side of the tie panel 3. The annular coupling portion 45 is positioned at the substantially middle and in the vicinity thereof between the annular coupling portions 44 and 46. The linear coupling portion 36 is provided between the annular coupling portions 45 and 46. A region between the annular coupling portions 44 and 45 is the gas passage portion 21.

The linear coupling portion 32 is arranged to extend from the annular coupling portion 42 toward the annular coupling portion 46. The linear coupling portion 33 is arranged to extend from the annular coupling portion 46 toward the annular coupling portion 42. The linear coupling portion 34 is arranged to extend from the annular coupling portion 43 toward the annular coupling portion 44. The linear coupling portion 35 is arranged to extend from the annular coupling portion 44 toward the annular coupling portion 43.

The linear coupling portion 32 is arranged to have a downward slope rearward, and the linear coupling portion 34 is arranged to have an upward slope rearward. Rear sides of the linear coupling portions 32 and 34 curvedly extend to be approached to each other and are connected to each other.

The linear coupling portion 35 is arranged to have a downward slope forward and the linear coupling portion 33 is arranged to have an upward slope forward. Front sides of the linear coupling portions 33 and 35 curvedly extend to be approached to each other and are connected to each other.

A predetermined gap is formed between the rear ends of the linear coupling portions 32, 34 and the front ends of the linear coupling portions 33, 35 to define a communication portion C for communicating the inflation portions 8 and 10 with each other. A width of the communication portion C in the front and rear direction is preferably 150 mm or less, in particular about 50~100 mm.

In this embodiment, the communication portion C is positioned at the substantially middle of the tie panel 3 and in the vicinity thereof in the front and rear direction. The communication portion C also is preferably positioned at 0 to 250 mm, in particular 0~150 mm, above the lower side of the tie panel 3.

The linear coupling portion 32 extends forward and upward from the communication portion C, the linear coupling portion 33 extends rearward and downward from the communication portion C, the linear coupling portion 34 extends forward and downward from the communication portion C, and the linear coupling portion 35 extends rearward and upward from the communication portion C. Meanwhile, the rearmost portion of the linear coupling portion 35 is substantially horizontal. The communication portion C is positioned on a lateral of a front seat of a vehicle.

In the inside of the curtain airbag main body 2, a region located between the linear coupling portions 32 and 35 is the inflation chamber 8, a region located between the linear coupling portions 32 and 34 is the inflation chamber 9, a region located between the linear coupling portions 34 and 33 is the inflation chamber 10, and a region located between the linear coupling portions 33 and 35 is the inflation chamber 11.

In a state where the curtain airbag main body 2 is not inflated, a horizontal distance from the middle point of the communication portion C in the front and rear direction to the linear coupling portion 31 is preferably about 150~450 mm, in particular 180~380 mm. The annular coupling portion 45 is preferably positioned in the rear of the communication portion C, and a distance from the middle point of the communication portion C to the annular coupling portion 45 in the front and rear direction is preferably about 150~450 mm, in particular 180~380 mm.

The annular coupling portion 45 is positioned above the annular coupling portion 44 and slightly rearward therefrom. Accordingly, the linear coupling portion 36 extends obliquely so that a rear portion thereof is located upward. In the rear of the linear coupling portion 36, the linear coupling portion 37 is provided to be substantially parallel to the linear coupling portion 36. A lower end of the linear coupling portion 37 is connected to the linear coupling portion 30 on the lower side of the curtain airbag main body 2. An upper end of the linear coupling portion 37 is connected on a front end of the linear coupling portion 38, which is substantially horizontal. The linear coupling portion 38 extends rearward to be substantially parallel to the linear coupling portion 30 on the upper side of the curtain airbag main body 2.

A rear end of the linear coupling portion 38 is connected to the linear coupling portion 39, which extends obliquely so that a rear side thereof is located downward. A lower end of the linear coupling portion 39 is connected to the annular coupling portion 47. A region between the annular coupling portion 47 and the linear coupon portion 30 on the lower side of the curtain airbag main body 2 is the gas passage portion 22.

A region between the linear coupling portion 37 and the linear coupling portion 36 is the inflation portion 12. A region between the linear coupling portion 38 and the linear coupling portion 30 on the upper side is to the inflation chamber 14. A region between the linear coupling portion 39 and the linear coupling portion 30 on the rear side is to the inflation chamber 15.

The annular coupling portion 48 is provided below the vicinity of the middle of the linear coupling portion 38 in the front and rear direction. The linear coupling portion 40 extends between the annular coupling portion 48 and the linear coupling portion 30 on the lower side. The linear coupling portion 40 extends substantially obliquely so that a rear side thereof is located upward. A region between the linear coupling portion 40 and the linear coupling portion 39 is the inflation chamber 16. A region between the linear coupling portions 40 and the linear coupling portions 37, 38 is the inflation chamber 17.

Tethers 51 and 52 for connecting the curtain airbag main body 2 to an A-pillar and a C-pillar of a vehicle body are respectively provided to extend from the front and rear sides of the curtain airbag main body 2. Also, attaching pieces 53 for connecting the curtain airbag main body 2 to a roof side rail of the vehicle body are provided to extend from the upper side of the curtain airbag main body 2.

An inflator (gas generator) is inserted in the inflator insert port 7 of the curtain airbag 1 and a fastener, such as a band, is fastened around an outer periphery of the inflator insertion port 7 so that the inflator is attached thereto. The inflator is fixed to the roof side rail of the vehicle.

Although not shown in the figures, the curtain airbag 1 is arranged along a roof side portion (boundary portion between a ceiling surface and a side surface in the vehicle interior) of the vehicle in a state where the curtain airbag 1 is folded to be elongated in the front and rear direction after the extension portion 2a of the curtain airbag main body 2 is folded up upward and also toward the opposite-interior side as in FIGS. 2 and 4. The tethers 51 and 52 are connected to the A-pillar and the C-pillar and each attaching piece 53 is fixed to the roof side rail by a fixture, such as a bolt or a rivet. The folded body of the curtain airbag 1 is covered with a roof garnish.

The curtain airbag 1 has a small package volume because plural of longitudinal cells are not provided therein.

When a vehicle having the curtain airbag device configured as described above is crashed or rolled over, the inflator is activated and thus gas is supplied from the inflator into the curtain airbag main body 2 so that the curtain airbag main body 2 starts to be inflated. The curtain airbag 1 pushes and opens the roof garnish and then is deployed along a side surface of a vehicle interior.

At this time, a flow of gas supplied from the inflator into the curtain airbag main body 2 is divided forward and rearward by the duct panel 4 (FIG. 3). A gas divided forward inflates the inflation chambers 8, 9, 10, 12 and 11 in this order. In this embodiment, the inflation chambers 8 and 10 are communicated with each other via the communication portion C and thus gas is also directly introduced into the inflation chamber 10 from the inflation chamber 8. Therefore, the curtain airbag main body 2 can be quickly deployed downward at the vicinity of the tie panel arranging portion thereof. A part of gas in the inflation chambers 9 and 10 is introduced into the inflation chamber 13 through the gas passage portion 20 to inflate the inflation chamber 13.

Because a length of the tie panel 3 in the upward and downward direction is shorter than a length of the tie panel arranging portion of the curtain airbag main body 2 (a length thereof in a state where the tie panel 3 is not connected thereto as in FIG. 3), if each of inflation chambers 8 to 11 is inflated, the curtain airbag main body 2 is inflated so that the vicinity of the communication portion C protrudes from the tie panel 3 toward the interior as shown in FIG. 5.

A gas divided rearward by the duct panel 4 flows in the curtain airbag main body 2 along the upper side thereof to inflate the inflation chamber 14 firstly and then inflate the inflation chamber 15 at the rearmost side, and subsequently passes through the gas passage portion 22 to successively inflate each of the inflation chambers 16 and 17.

Figure 7:
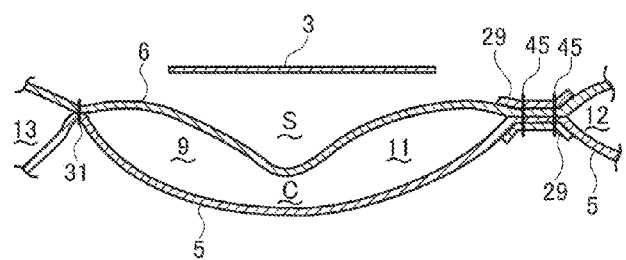
FIG. 7 is a section view of the same portion as that of FIG. 6 in a state where the curtain airbag is inflated.

In a state where the curtain airbag main body 2 is inflated, four inflation chambers 8 to 11 at upper, front, lower and rear sides of the communication portion C in the tie panel arranging portion are inflated as in FIGS. 5 and 7, so the a substantially truncated square pyramid-shaped space S is formed between the communication portion C and the tie panel 3. In this embodiment, the inflation chamber 8 at the upper side, the communication chamber C and the inflation chamber 10 at the lower side are continuously arranged so that an interior-side surface in the vicinity of the communication portion C has a shape relatively similar to a flat surface. When the vicinity of the communication portion C receives a passenger, the curtain airbag main body 2 is deformed so that a volume of each of inflation chambers 8 to 11 is reduced and also a thickness of the space S (a distance from the communication portion C to the tie panel 3) is decreased, thereby absorbing a kinetic energy of the passenger.

Figure 8:
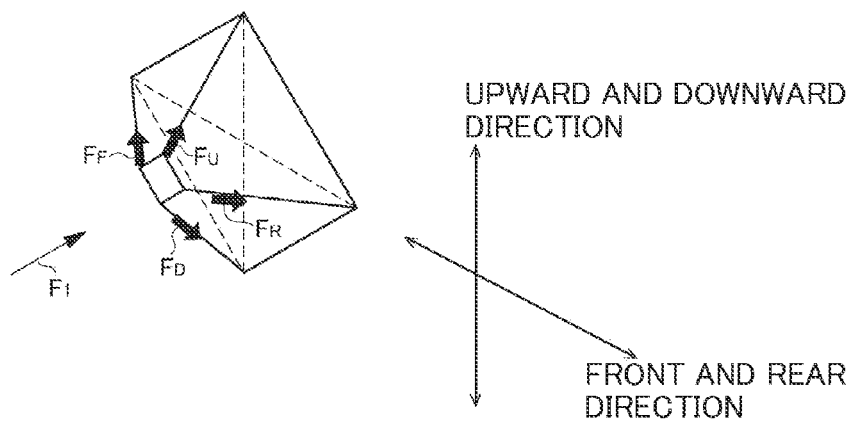
FIG. 8 is a schematic perspective view showing a structure in which an input force to the curtain airbag according to the embodiment is divided into component forces.

In this embodiment, when the passenger is bumped against the vicinity of the communication portion C as in FIG. 8, a force F1 exerted on the curtain airbag 1 from the passenger 1 is counteracted by the inflation chambers 8 to 11 positioned in four-directions of front, rear, upper and lower sides with respect to the communication portion C. Namely, the force F1 is divided into an upward component force FU, a forward component force FF, a downward component force FD and a rearward component force FR, and each of component forces FU, FF, FD and FR is respectively counteracted by each of inflation chambers 8, 9, 10 and 11. Therefore, even if an internal pressure of the curtain airbag main body 2 is low, the curtain airbag main body 2 can counteract each of component forces FU, FF, FD and FR to absorb the kinetic energy of the passenger. Accordingly, it is sufficient even if the inflator has a small capacity.

Figure 9:
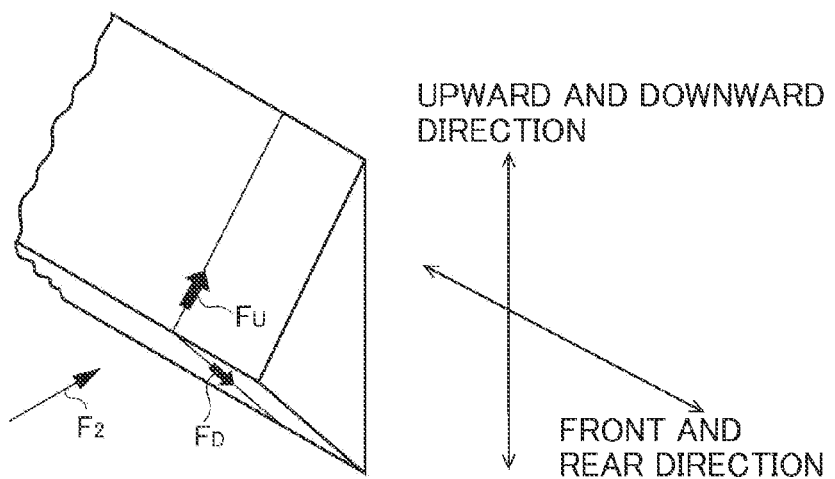
FIG. 9 is a schematic perspective view showing a structure in which an input force to a curtain airbag according to a conventional example is divided into component forces.

On the other hand, in a case of a curtain airbag, which is inflated in a triangular prism shape having a triangle shape as viewed from the lateral side as in FIG. 7C of Patent Document 1, a force F2 exerted on the curtain airbag from a passenger is divided into an upward component force FU and a downward component force FD as in FIG. 9 of the present invention, and thus each of component forces FU and FD is larger than each of component forces FU and FD in FIG. 8 of the present invention. Therefore, it is necessary that an internal pressure of the curtain airbag is higher than the case of FIG. 8 to counteract each of larger component forces FU and FD. Therefore, it is necessary to use a high power inflator.

Figure 10:
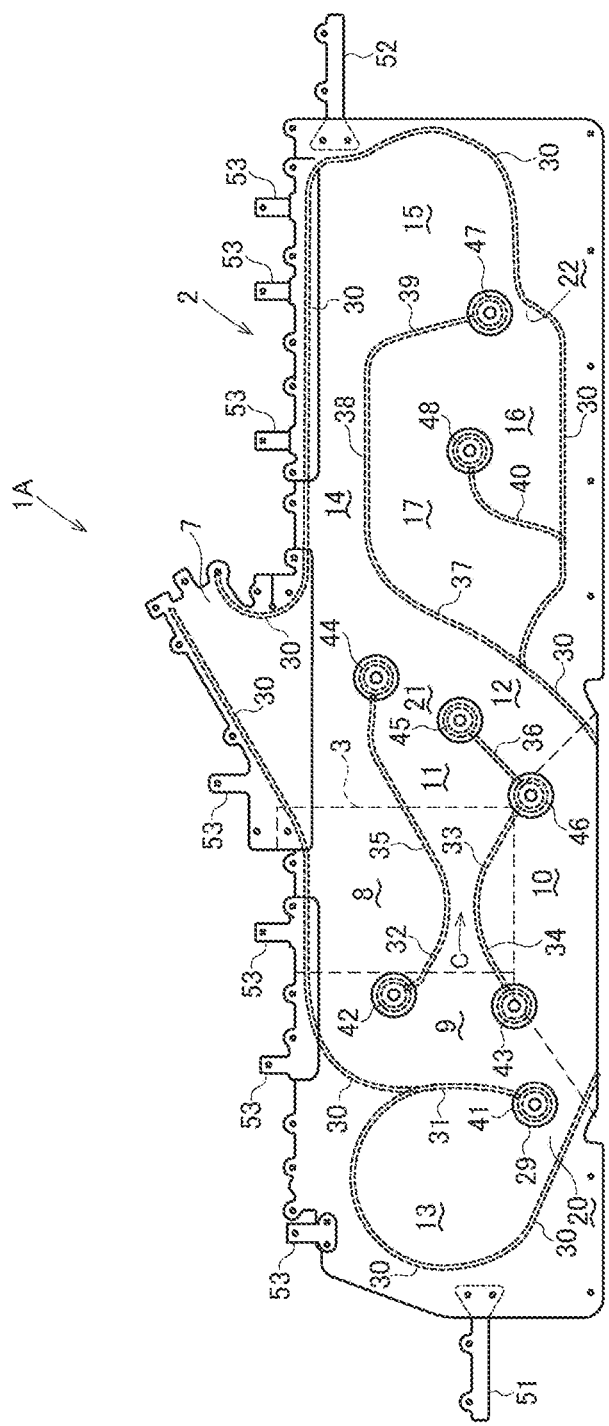
FIG. 10 is a front view of a curtain airbag according to another embodiment.

In the embodiment where the communication portion C communicates the inflation chambers 8 and 10 with each other, the communication portion C may communicate front and rear inflation chambers 9 and 11 with each other as in a curtain airbag 1A of FIG. 10. In FIG. 10, linear coupling portions 32 and 35 are connected to each other and linear coupling portions 34 and 33 are connected to each other. The communication portion C is formed between a portion where the linear coupling portions 32 and 35 intersect each other and a portion where the linear coupling portions 34 and 33 intersect each other. In FIG. 10, the linear coupling portions 32, 33, 34 and 35 also radially extend from the communication portion C.

The other configurations of the curtain airbag 1A are the same as those of the curtain airbag 1 and thus the same references numerals designate the same portions.

According to the curtain airbag 1A, when an inflator is activated, in addition to gas from the inflation chambers 10 and 12, a part of gas in the inflation chamber 9 is also introduced into the inflation chamber 11 through the communication portion C, so that the inflation chamber 11 can be quickly inflated. The inflation chamber 10 is inflated by gas from the inflation chamber 9. The other inflation operations of the curtain airbag 1A are the same as those of the curtain airbag 1.

Figure 11:
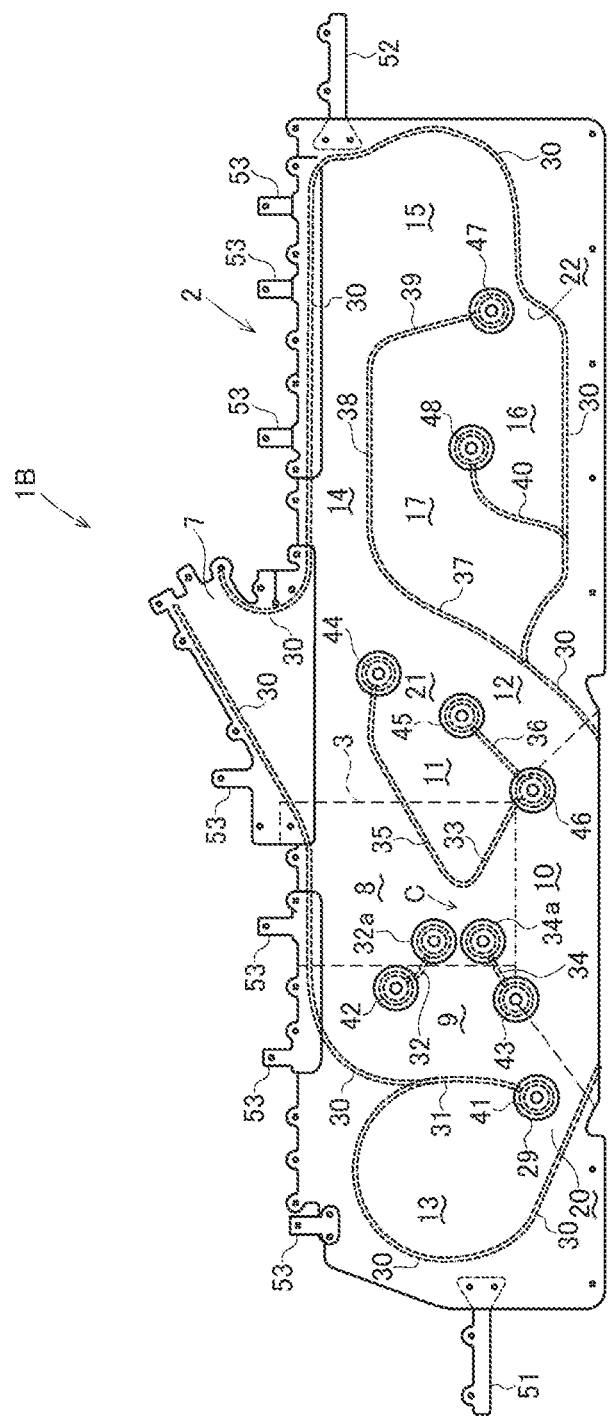
FIG. 11 is a front view of a curtain airbag according to further another embodiment.

According to a curtain airbag 1B of FIG. 11, rear ends of linear coupling portions 32 and 34 are respectively connected to annular coupling portions 32a and 34a. The annular coupling portions 32a and 34a are positioned in a front portion of a region in which a tie panel 3 is arranged. The annular coupling portion 32a is positioned above the annular coupling portion 34a. A gap for allowing gas to flow therethrough is formed between the annular coupling portions 32a and 34a and thus constitutes a part of a communication portion C. A gap is formed between the annular coupling portions 32a and 34a and the linear coupling portions 33 and 35 and constitutes a part of the communication portion C.

Thus, in this embodiment, the inflation chambers 9, 10 and 11 are communicated with each other by the communication portion C.

The other configurations of the curtain airbag 1B are the same as those of the curtain airbag 1 and thus the same references numerals designate the same portions.

According to the curtain airbag 1B, when an inflator is activated, a part of gas in the inflation chamber 8 is also flowed into the inflation chambers 9 and 10 through the communication chamber C. Accordingly, the inflation chambers 9 and 10 can be early inflated.

Figure 12:
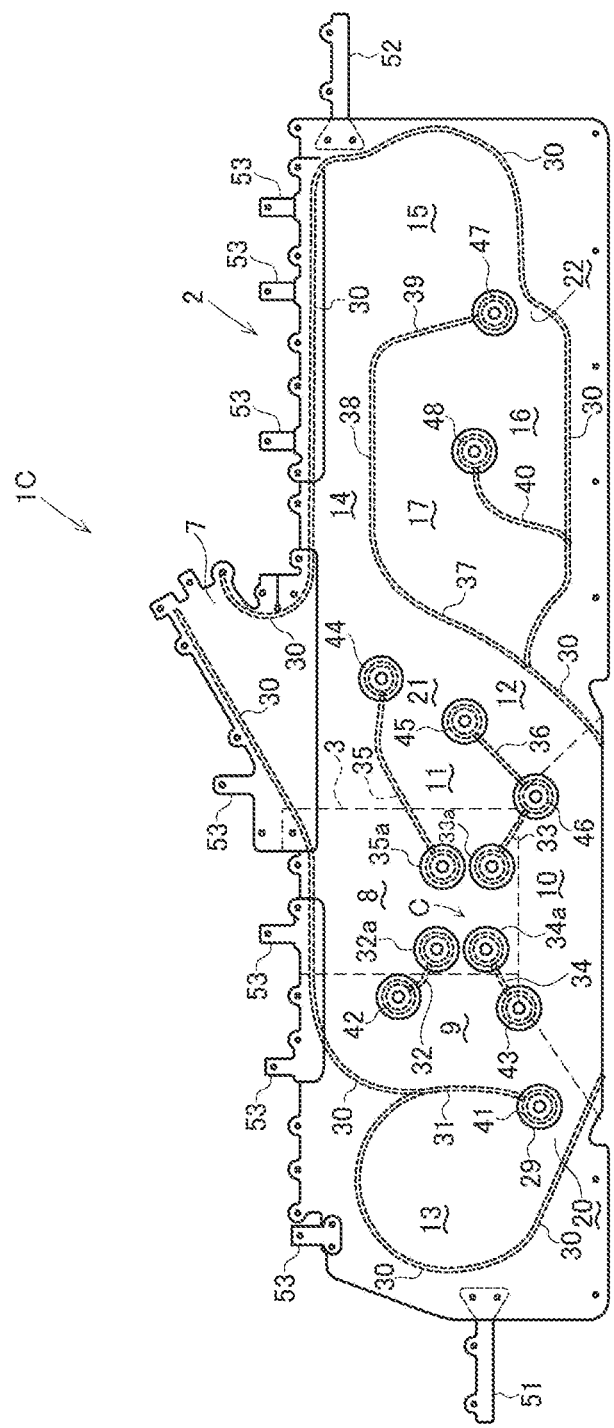
FIG. 12 is a front view of a curtain airbag according to further another embodiment.

Like the curtain airbag 1B of FIG. 11, a curtain airbag 1C of FIG. 12 is configured so that rear ends of linear coupling portions 32 and 34 are respectively connected to annular coupling portions 32a and 34a. In the curtain airbag 1C, front ends of the linear coupling portions 33 and 35 are additionally connected to annular coupling portions 33a and 35a. The annular coupling portions 33a and 35a are positioned in a rear portion of a region in which a tie panel is arranged. The annular coupling portion 35a is positioned in the rear of the annular coupling portion 32a and the annular coupling portion 33a is positioned in the rear of the annular coupling portion 34a. The annular coupling portion 35a is positioned above the annular coupling portion 33a. A gap for allowing gas to flow therethrough is formed between the annular coupling portions 33a and 35a and thus constitutes a part of a communication portion C. A gap is formed between the annular coupling portions 32a and 34a and the annular coupling portions 33s and 35s and constitutes a part of the communication portion C.

Thus, in this embodiment, four inflation chambers 8 to 11 are communicated with each other by the communication portion C.

The other configurations of the curtain airbag 1C are the same as those of the curtain airbag 1B and thus the same references numerals designate the same portions.

According to the curtain airbag 1C, when an inflator is activated, a part of gas in the inflation chamber 8 is also flowed into the inflation chambers 9, 10 and 11 through the communication chamber C. Accordingly, the inflation chambers 9, 10 and 11 can be early inflated.

Figure 13:
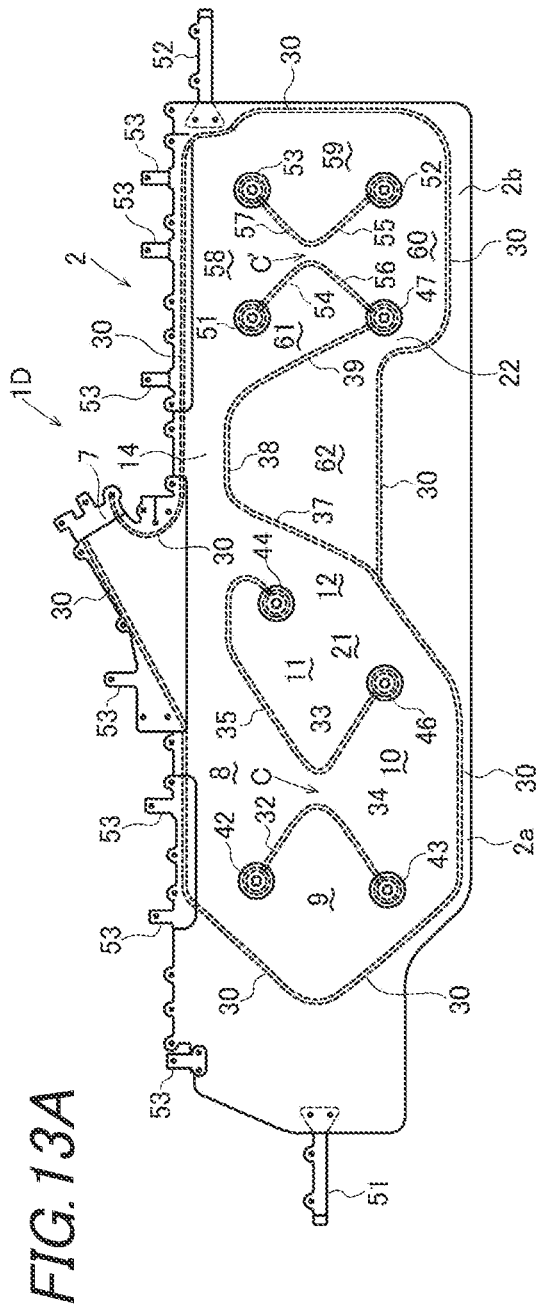
FIG. 13A is a front view of a curtain airbag main body according to further another embodiment.
FIG. 13B is a front view of a curtain airbag.

The curtain airbags 1 to 1C have a portion, which is to be inflated in a truncated square prism shape, only on a front seat side thereof, but may be also provided with a truncated square prism-shaped inflation portion at a location, which faces a rear seat of a vehicle as in a curtain airbag 1D of FIG. 13.

In the curtain airbag 1D, as shown in FIG. 13A, an annular coupling portion 51 is provide above an annular coupling portion 47 in a rear portion of a curtain airbag main body 2, an annular coupling portion 52 is provided in the rear of the annular coupling portion 47, and also an annular coupling portion 53 is provided in the rear of the annular coupling portion 47 and also above the annular coupling portion 52. The annular coupling portion 51 is spaced from linear coupling portions 38 and 39.

Linear coupling portions 54 and 55 are respectively arranged to extend from the annular coupling portion 51 toward the annular coupling portion 52 and from the annular coupling portion 52 toward the annular coupling portion 51. Linear coupling portions 56 and 57 are respectively arranged to extend from the annular coupling portion 47 toward the annular coupling portion 53 and from the annular coupling portion 53 toward the annular coupling portion 47.

The linear coupling portion 54 is arranged to have a downward slope rearward and the linear coupling portion 56 is arranged to have an upward slope rearward. Rear sides of the linear coupling portions 54 and 56 curvedly extend to be approached to each other and are connected to each other.

The linear coupling portion 57 is arranged to have a downward slope forward and the linear coupling portion 55 is arranged to have an upward slope forward. Front sides of the linear coupling portions 55 and 57 curvedly extend to be approached to each other and are connected to each other.

A predetermined gap is formed between the rear ends of the linear coupling portions 54 and 56 and the front ends of the linear coupling portions 55 and 57 to define a communication portion C' for communicating inflation portions 58 and 60 with each other. A width of the communication portion C' in the front and rear direction is preferably 150 mm or less, in particular about 50~100 mm.

The linear coupling portion 54 extends forward and upward from the communication portion C', the linear coupling portion 55 extends rearward and downward from the communication portion C', the linear coupling portion 56 extends forward and downward from the communication portion C', and the linear coupling portion 57 extends rearward and upward from the communication portion C'.

In the inside of the curtain airbag main body 2, a region located between the linear coupling portions 54 and 57 is the inflation chamber 58, a region located between the linear coupling portions 57 and 55 is the inflation chamber 59, a region located between the linear coupling portions 55 and 56 is the inflation chamber 60, and a region located between the linear coupling portions 56 and 54 is the inflation chamber 61.

In a state where the curtain airbag main body 2 is not inflated, a horizontal distance from the middle point of the communication portion C' in the front and rear direction to the linear coupling portion 39 is preferably about 150~450 mm, in particular 180~380 mm. A distance from the middle point of the communication portion C' in the front and rear direction to the annular coupling portion 30 on a rear side of the curtain airbag main body 2 is preferably about 150~450 mm, in particular 180~380 mm.

A lower side of a rear portion of the curtain airbag main body 2 is provided with an extension portion 2b extending downward, and a lower side portion of a tie panel 3R is coupled to a lower side of the extension portion 2b by sewing or the like. An upper side portion of the tie panel 3R is coupled to an upper side of the curtain airbag main body 2 by sewing or the like. A length from the upper side portion to the lower side portion of the tie panel 3R in a state where the tie panel 3R is flatly spread is longer than a length from the upper side of the curtain airbag main body 2 to the lower side of the extension portion 2b before the tie panel 3R is attached thereto. When the curtain airbag 1D is folded, both extension portions 2a and 2b are a state shown in FIG. 13B where the extension portions 2a and 2b are folded up toward the opposite-interior side of the curtain airbag main body 2. From this state, the curtain airbag is folded to be elongated in the front and rear direction and then is installed to a roof side of a vehicle.

Meanwhile, the inflation chamber 13 on the most front side, which is provided on the curtain airbags 1, 1A to 1C, is omitted from the curtain airbag 1D.

Also, in FIGS. 13A and B, the annular coupling portion 45 is omitted and the annular coupling portion 44 is positioned at a location slightly lower than those in the curtain airbags 1, 1A to 1C. The linear coupling portion 35 is curved downward in a substantially J-shape in the rear of the annular coupling portion 44 and then is connected to the annular coupling portion 44.

Also, in the curtain airbag 1D, the annular coupling portion 48 and the linear coupling portion 40 connected thereto, which are provided on the curtain airbags 1, 1A to 1C, are omitted and a single inflation chamber 62 surrounded by the linear coupling portions 37, 38 and 39 and the linear coupling portion 30 on the lower side of the curtain airbag is provided. The inflation chamber 62 is communicated with the inflation chamber 60 via a gas passage portion 22.

The other configurations of the curtain airbag 1D of FIGS. 13A and B are the same as those of the curtain airbag 1 of FIG. 1 and thus the same references numerals designate the same portions.

Inflation operations of a front half side of the curtain airbag 1D of FIGS. 13A and 13B are the same as those of the curtain airbag 1, except that the inflation chamber 13 does not exist. Inflation operations of a rear half side of the curtain airbag 1D is as follows. Specifically, a gas divided rearward by the duct panel 4 (see FIG. 3) inflates the inflation chamber 14 and then inflates the inflation chamber 58. A part of gas directed toward the inflation chamber is introduced into the inflation chamber 61 to inflate the inflation chamber 61. A gas passing through the inflation chamber 58 successively inflates the inflation chambers 59, 60 and 62. A part of gas in the inflation chamber 58 is introduced into the inflation chamber 60 through the communication portion C', so that the inflation chamber 60 can be early inflated.

In the curtain airbag 1D of FIGS. 13A and B, configurations of the vicinity of the communication C of the front portion of the curtain airbag are the same as those of the curtain airbag 1 of FIG. 1, but may have configurations of the curtain airbag 1A, 1B or 1C. Also, the rear portion of the curtain airbag 1D is configured so that the communication portion C' communicates upper and lower inflation chambers 58 and 60 with each other as in the front portion of the curtain airbag 1 of FIG. 1, but may be configured so that the communication portion communicates front and rear inflation chambers with each other, communicates three inflation chambers with each other or communicates four inflation chambers with each other as in the curtain airbag 1A, 1B or 1C.

Although not shown, in the present invention, the front half portion of the curtain airbag 1D may be configured so that the extension portion 2a and the tie panel 3 are not provided.

Figure 14:
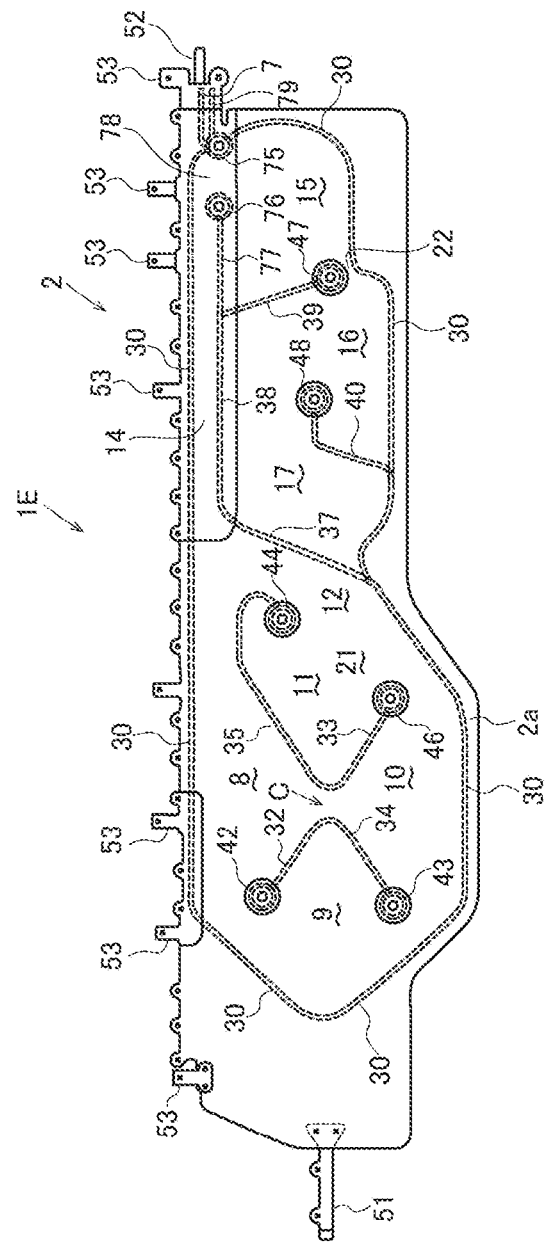
FIG. 14 is a front view of a curtain airbag main body according to further another embodiment.
Figure 15:
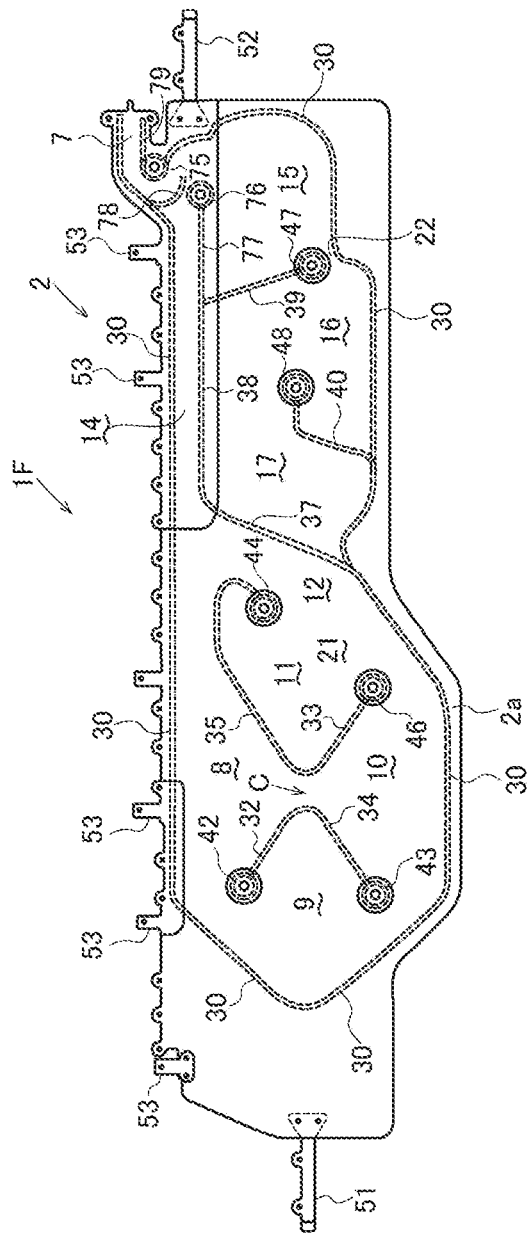
FIG. 15 is a front view of a curtain airbag main body according to further another embodiment.

Although in all of the foregoing embodiments, the inflator insertion port 7 is provided in the vicinity of the middle of the upper side of the curtain airbag main body in the front and rear direction, the inflator insertion port may be provided on the front portion or rear portion of the curtain airbag main body. These examples are shown in FIGS. 14 and 15. A curtain airbag 1E of FIG. 14 is configured so that the inflator insertion port 7 is provided on an upper portion of a rear side of the curtain airbag main body 2. In the curtain airbag 1E, a linear coupling portion 77 extends rearward from a connection portion between a linear coupling portion 38 and a linear coupling portion 39. An annular coupling portion 76 is provided on a rear end of the linear coupling portion 77. An annular coupling portion 75 is provided in the rear of the annular coupling portion 76 and a linear coupling portion 30 on a rear side of the curtain airbag main body is connected to the annular coupling portion 75. A linear coupling portion 79 extends rearward from the annular coupling portion 75 along a lower side of the inflator insertion port 7. A region between the annular coupling portions 76 and 75 is a gas passage portion 78 for allowing gas to be introduced into an inflation chamber 15. The other configurations of the curtain airbag 1E are the same as those of the curtain airbag 1 of FIG. 1, except that the inflation chamber 13 in the front portion is omitted and also the annular coupling portion 45 and the linear coupling portion 36 are not provided, and thus the same references numerals designate the same portions.

Gas from an inflator installed in the inflator insertion port 7 passes through an inflation chamber 14 between the linear coupling portion 30 on the upper side of the curtain airbag main body and the linear coupling portions 77 and 38 to be supplied to a front half side of the curtain airbag main body 2, and thus the inflation chambers 8 to 12 are inflated to form a truncated square prism shape. A part of gas from the inflator is introduced into the inflation chamber 15 from the gas passage portion 78 to successively inflate the inflation chambers 15, 16 and 17.

In a curtain airbag 1F of FIG. 15, an inflator insertion port 7 is provided on a rear portion of the upper side of the curtain airbag 1F. In the curtain airbag 1F, the annular coupling portion 75 is positioned obliquely upward in the rear of the annular coupling portion 76. Alternatively, the inflator insertion port 7 may be provided on a more front side than that as shown in FIG. 15.

The other configurations of the curtain airbag 1F are the same as those of the curtain airbag 1E of FIG. 14 and thus the same references numerals designate the same portions. Also, inflation operations of the curtain airbag 1F when the inflator is activated are the same as those of the curtain airbag 1E.

Figure 16:
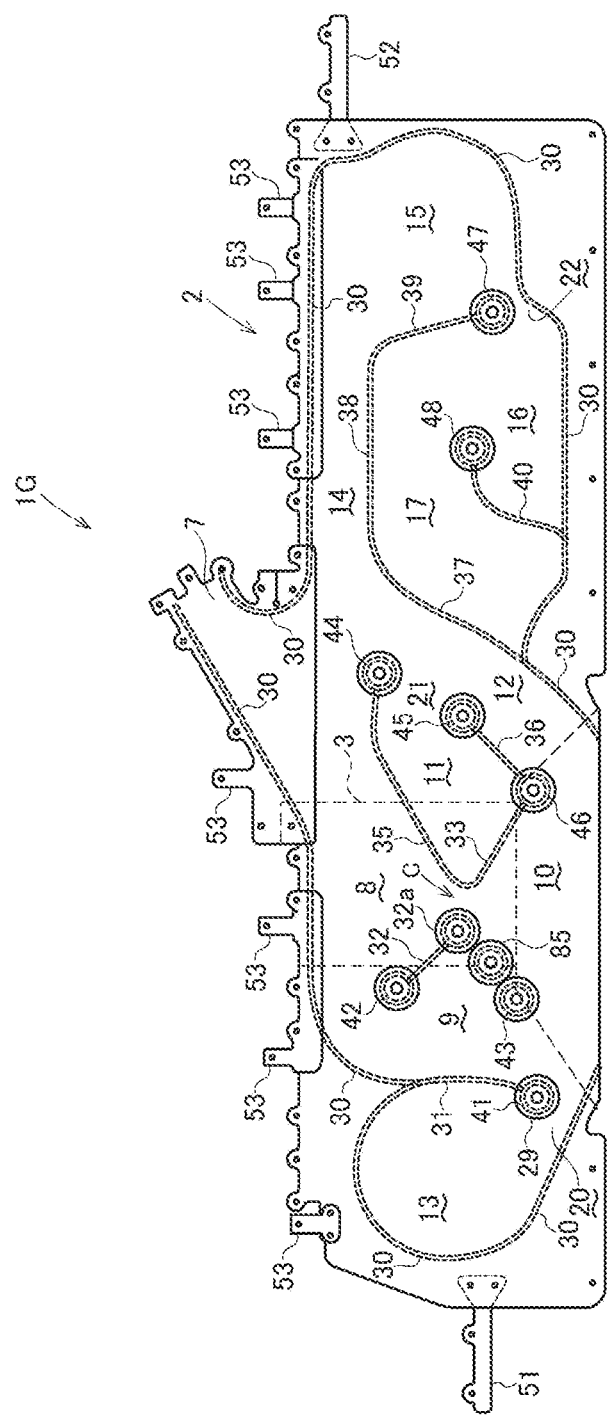
FIG. 16 is a front view of a curtain airbag according to further another embodiment.

Although in the foregoing embodiments, inflation chambers are delimited by four linear coupling portions, some of the linear coupling portions may be replaced with a plurality of annular coupling portions arranged in a row shape. This example is shown in FIG. 16. In a curtain airbag 1G of FIG. 16, the linear coupling portion 34 is omitted and instead annular coupling portions 32a and 85 are provided. The annular coupling portion 32a is connected with a rear end of the linear coupling portion 32, like that in the curtain airbag 1B. The annular coupling portion 85 is positioned between the annular coupling portions 32a and 43. A gap is formed between the annular coupling portion 85 and the annular coupling portions 32a and 43, and the inflation chambers 9 and 10 are communicated with each other via the gap portion.

The other configurations of the curtain airbag 1G are the same as those of the curtain airbag 1 of FIG. 1 and thus the same references numerals designate the same portions.

When the curtain airbag 1G is inflated, gas from the inflation chambers 8 and 9 is introduced into the inflation chamber 10. A part of gas from the inflation chamber 9 passes between the annular coupling portions 43 and 85 and then between the annular coupling portions 85 and 32a and thus introduced into the inflation chamber 10.

Although in FIG. 16, the linear coupling portion 34 is replaced with the annular coupling portion arrangement, other one or more linear coupling portions may be replaced with annular coupling portion arrangements.

Figure 17A:
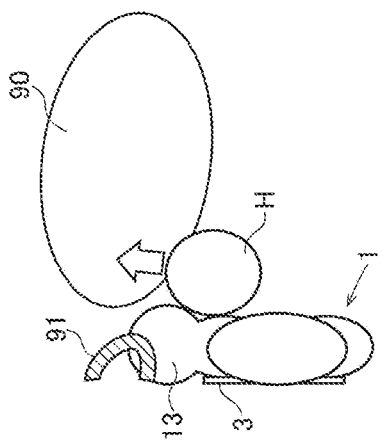
FIGS. 17A, 17B and 17C are schematic plan views of an interior of a vehicle having a curtain airbag.
Figure 17B:
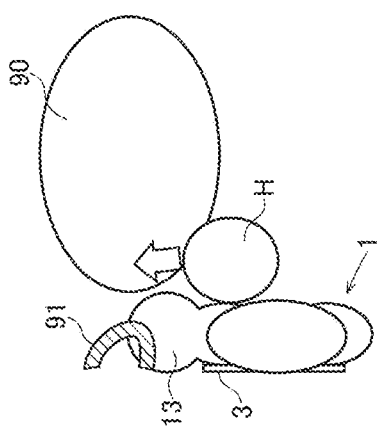
Figure 17C:
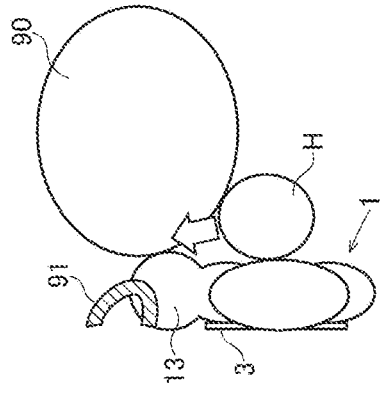

The curtain airbag according to the present invention, in particular the curtain airbag of FIGS. 1 to 7, is suitable to retain a passenger on a driver seat upon a small overlap crash (narrow offset crash). Namely, upon a small overlap crash, the curtain airbag 1 and the driver seat airbag 90 as in FIG. 17A are inflated so that the passenger on the driver seat is retained. In this case, the front half portion of the curtain airbag 1, which is inflated in a truncated square prism shape, exerts a reaction portion on a passenger head H. Also, because the inflation chamber 14 having a large inflation thickness is arranged on the most front portion of the curtain airbag 1, the passenger head H is guided toward the driver seat airbag 90 as in FIGS. 17B and 17C, not in a direction toward an A-pillar 91, and is eventually retained by the driver seat airbag 90.

Although in the foregoing embodiments, linear coupling portions (or annular coupling portion arrangements) are provided in four radial directions to form a passenger retaining portion having a truncated square prism shape, the portions may be provided in three, five or more radial directions. Also, although in the forgoing embodiments, all of regions between four radial linear coupling portions (or annular coupling portion arrangements) form inflation chambers, some of the inflation chambers may be constructed by non-inflation panels, not inflation chambers.

The foregoing embodiments are examples of the present invention, and thus the present invention is not limited to the foregoing embodiments.

What is claimed is:

1. A curtain airbag which is configured to be deployed downward along a side surface of an interior of a vehicle, the curtain airbag comprising:
   a curtain airbag main body that is inflated by gas from an inflator; and
   a tie panel that is arranged on an opposite-interior surface of a tie panel arranging portion and that is connected to an upper portion and a lower portion of the curtain airbag main body by an upper connection unit and a lower connection unit respectively, the tie panel arranging portion being a middle part of the curtain airbag main body in a front and rear direction of the vehicle,
   wherein the curtain airbag main body includes:
      a first panel on an interior side;
      a second panel on an opposite-interior side; and
      a coupling portion which couples the first panel and the second panel with each other,
   wherein the coupling portion includes:
      a peripheral edge coupling portion which extends along peripheral edges of the first panel and the second panel; and
      an inner coupling portion which is positioned more inward than the peripheral edge coupling portion,
   wherein a length of the tie panel from the upper connection unit to the lower connection unit is shorter than a length of the curtain airbag main body from the upper connection unit to the lower connection unit,
   wherein the inner coupling portion includes radial coupling portions which are provided to extend in three or more multi radial directions from a center portion of the tie panel arranging portion or a vicinity of the center portion,
   wherein a plurality of inflation chambers are delimited in the tie panel arranging portion by the radial coupling portions, and
   wherein a communication portion is provided between at least two radial coupling portions and is provided on the center portion of the tie panel arranging portion or the vicinity of the center portion to communicate at least two inflation chambers with each other.

2. The curtain airbag according to claim 1,
   wherein the radial coupling portions in at least three directions extend obliquely upward or downward from the center portion of the tie panel arranging portion or the vicinity of the center portion in the front and rear direction of the vehicle.

3. The curtain airbag according to claim 2,
   wherein the radial coupling portions includes:
      a first radial coupling portion that is provided to extend forward and upward from the center portion of the tie panel arranging portion or the vicinity of the center portion in the front and rear direction of the vehicle;
a second radial coupling portion that is provided to extend forward and downward in the front and rear direction of the vehicle;
a third radial coupling portion that is provided to extend rearward and downward in the front and rear direction of the vehicle; and
a fourth radial coupling portion that is provided to extend rearward and upward in the front and rear direction of the vehicle.

4. The curtain airbag according to claim 3,
wherein a rear end of the first radial coupling portion is connected with a rear end of the second radial coupling portion,
wherein a front end of the third radial coupling portion is connected with a front end of the fourth radial coupling portion, and
wherein the communication portion communicates an upper inflation chamber above the communication portion with a lower inflation chamber below the communication portion.

5. The curtain airbag according to claim 3,
wherein a rear end of the first radial coupling portion is connected with a front end of the fourth radial coupling portion,
wherein a rear end of the second radial coupling portion is connected with a front end of the third radial coupling portion, and
wherein the communication portion communicates a front side inflation chamber in front of the communication portion with a rear side inflation chamber in the rear of the communication portion.

6. A curtain airbag device comprising:
the curtain airbag according to claim 1; and
the inflator that inflates the curtain airbag.

7. A curtain airbag which is configured to be deployed downward along a side surface of an interior of a vehicle, the curtain airbag comprising:
a curtain airbag main body that is inflated by gas from an inflator; and
a tie panel that is arranged on an opposite-interior surface of a tie panel arranging portion and that is connected to an upper portion and a lower portion of the curtain airbag main body by an upper connection unit and a lower connection unit respectively, the tie panel arranging portion being a middle part of the curtain airbag main body in a front and rear direction of the vehicle,
wherein the curtain airbag main body includes:
a first panel on an interior side;
a second panel on an opposite-interior side; and
a coupling portion which couples the first panel and the second panel with each other,
wherein the coupling portion includes:
a peripheral edge coupling portion which extends along peripheral edges of the first panel and the second panel; and
an inner coupling portion which is positioned more inward than the peripheral edge coupling portion,
wherein a length of the tie panel from the upper connection unit to the lower connection unit is shorter than a length of the curtain airbag main body from the upper connection unit to the lower connection unit,
wherein the inner coupling portion includes radial coupling portions which are provided to extend in three or more multi radial directions from a center portion of the tie panel arranging portion or a vicinity of the center portion,
wherein a plurality of inflation chambers are delimited in the tie panel arranging portion by the radial coupling portions,
wherein a communication portion is provided on the center portion of the tie panel arranging portion or the vicinity of the center portion to communicate at least two inflation chambers with each other, and
wherein a length of the tie panel arranging portion is shorter than a length of the curtain airbag main body including an extension portion, in the upward and downward direction.

\* \* \* \* \*